US012640384B2

(12) United States Patent
Chang et al.

(10) Patent No.: US 12,640,384 B2
(45) Date of Patent: May 26, 2026

(54) SOE-SOFC-CCS HYBRID SYSTEM

(71) Applicant: FCI CO., LTD., Daejeon (KR)

(72) Inventors: In Gab Chang, Daejeon (KR); Tae Won Lee, Goyang-si (KR); Bo Hyun Ryu, Daejeon (KR); Young Jun Choi, Dongan-gu (KR); Myung Jun Won, Daejeon (KR)

(73) Assignee: FCI CO., LTD., Daejeon (KR)

( * ) Notice: Subject to any disclaimer, the term of this patent is extended or adjusted under 35 U.S.C. 154(b) by 544 days.

(21) Appl. No.: 18/266,364

(22) PCT Filed: Apr. 17, 2023

(86) PCT No.: PCT/KR2023/005188
§ 371 (c)(1),
(2) Date: Jun. 9, 2023

(87) PCT Pub. No.: WO2023/234553
PCT Pub. Date: Dec. 7, 2023

(65) Prior Publication Data
US 2024/0387907 A1 Nov. 21, 2024

(30) Foreign Application Priority Data

Jun. 3, 2022 (KR) ........................ 10-2022-0067900

(51) Int. Cl.
H01M 8/0668 (2016.01)
C25B 13/07 (2021.01)
(Continued)

(52) U.S. Cl.
CPC ........... H01M 8/0668 (2013.01); C25B 13/07 (2021.01); C25B 15/08 (2013.01);
(Continued)

(58) Field of Classification Search
None
See application file for complete search history.

(56) References Cited

U.S. PATENT DOCUMENTS

2003/0175565 A1* 9/2003 Noda .................. H01M 8/0612
429/513
2008/0314741 A1* 12/2008 Balestrino ........... H01M 8/0656
204/274
(Continued)

FOREIGN PATENT DOCUMENTS

JP 2009-117054 A 5/2009
JP 2015-507813 A 3/2015
(Continued)

*Primary Examiner* — Gregg Cantelmo
(74) *Attorney, Agent, or Firm* — Sughrue Mion, PLLC

(57) ABSTRACT

Disclosed is a hybrid system in which a solid oxide electrolyzer cell (SOE), a solid oxide fuel cell (SOFC), and a carbon capture system (CCS) are coupled to each other, and more particularly to an SOE-SOFC-CCS hybrid system configured such that a solid oxide electrolyzer cell, a solid oxide fuel cell including a burner configured to burn off-gas, and a carbon capture system are systematically operated and such that by-products and waste heat generated as the result of operation thereof are recycled, whereby consumption of hydrogen and a fuel necessary for power production is minimized.

8 Claims, 6 Drawing Sheets

(51) Int. Cl.

| | | |
|---|---|---|
| *C25B 15/08* | (2006.01) | |
| *H01M 8/04014* | (2016.01) | |
| *H01M 8/0432* | (2016.01) | |
| *H01M 8/04746* | (2016.01) | |
| *H01M 8/0612* | (2016.01) | |
| *H01M 8/0656* | (2016.01) | |
| *H01M 8/12* | (2016.01) | |
| *H01M 16/00* | (2006.01) | |

(52) U.S. Cl.

CPC ..... *H01M 8/04022* (2013.01); *H01M 8/0432* (2013.01); *H01M 8/04373* (2013.01); *H01M 8/04761* (2013.01); *H01M 8/04776* (2013.01); *H01M 8/0612* (2013.01); *H01M 8/0618* (2013.01); *H01M 8/0656* (2013.01); *H01M 8/12* (2013.01); *H01M 16/003* (2013.01); *H01M 2008/1293* (2013.01)

(56) References Cited

U.S. PATENT DOCUMENTS

| | | | |
|---|---|---|---|
| 2013/0108936 A1* | 5/2013 | McElroy ............. | H01M 8/0668 |
| | | | 429/410 |
| 2022/0246966 A1* | 8/2022 | Brown ................ | H01M 8/0656 |

FOREIGN PATENT DOCUMENTS

| | | | |
|---|---|---|---|
| JP | 2015-130337 | A | 7/2015 |
| JP | 6755424 | B1 | 9/2020 |
| KR | 10-1352227 | B1 | 1/2014 |
| KR | 10-2017-0034718 | A | 3/2017 |
| KR | 10-2020-0110501 | A | 9/2020 |
| KR | 10-2243329 | B1 | 4/2021 |
| KR | 10-2022-0058799 | A | 5/2022 |

* cited by examiner

SOE-SOFC-CCS HYBRID SYSTEM

CROSS REFERENCE TO RELATED APPLICATIONS

This application is a National Stage of International Application No. PCT/KR2023/005188 filed Apr. 17, 2023, claiming priority based on Korean Patent Application No. 10-2022-0067900 filed Jun. 3, 2022.

BACKGROUND OF THE INVENTION

Field of the Invention

The present disclosure relates to a hybrid system in which a solid oxide electrolyzer cell (SOE), a solid oxide fuel cell (SOFC), and a carbon capture system (CCS) are coupled to each other, and more particularly to an SOE-SOFC-CCS hybrid system configured such that a solid oxide electrolyzer cell, a solid oxide fuel cell including a burner configured to burn off-gas, and a carbon capture system are systematically operated and such that by-products and waste heat generated as the result of operation thereof are recycled, whereby consumption of hydrogen and a fuel necessary for power production minimized.

Description of the Related Art

A solid oxide fuel cell (SOFC) is configured to have a structure in which a plurality of electricity generating units, each of which includes a unit cell and a separator, is stacked. The unit cell includes an electrolyte, a cathode located on one surface of the electrolyte, and an anode located on the other surface of the electrolyte.

When oxygen is supplied to the cathode and hydrogen is supplied to the anode, oxygen reduction reaction occurs at the cathode, whereby oxygen ions are generated. The oxygen ions move to the anode through an electrolyte membrane, and react with the hydrogen supplied to the anode, whereby water is generated. At this time, electrons are generated at the anode, and the electrons are transported to the cathode and consumed at the cathode. As a result, the electrons flow to an external circuit. The unit cell produces electrical energy using such flow of the electrons.

A solid oxide electrolyzer cell is a device that electrolyzes pure water using electrical energy to produce hydrogen. In general, the solid oxide electrolyzer cell is operated at a temperature of 500 to 850° C., at which high-temperature electrolysis may occur.

SUMMARY OF THE INVENTION

The present disclosure has been made in view of the above problems, and it is an object of the present disclosure to provide a plan to efficiently utilize off-gas of a solid oxide electrolyzer cell without directly discharging the same in a hybrid system including the solid oxide electrolyzer cell and a solid oxide fuel cell.

It is another object of the present disclosure to provide a plan to effectively capture carbon dioxide from non-reacted hydrogen included in anode off-gas of a stack or off-gas of a solid oxide electrolyzer cell in a hybrid system including the solid oxide electrolyzer cell, a solid oxide fuel cell, and a carbon capture system.

It is a further object of the present disclosure to provide a plan to recycle by-products and waste heat generated during systematic operation of the solid oxide fuel cell and the carbon capture system in order to minimize fuel consumption.

In accordance with the present disclosure, the above and other objects can be accomplished by the provision of an SOE-SOFC-CCS hybrid system including a solid oxide electrolyzer cell (SOE), a solid oxide fuel cell (SOFC) including a reformer, a fuel heat exchanger (fuel HX) configured to heat a fuel produced by the reformer, a first air heat exchanger (air HX_A) configured to primarily heat outside air, a second air heat exchanger (air HX_B) configured to secondarily heat the primarily heated outside air, a stack including an anode configured to receive the fuel heated by the fuel heat exchanger and a cathode configured to receive the outside air heated by the first air heat exchanger and the second air heat exchanger, and a burner configured to burn off-gas of the solid oxide electrolyzer cell and anode off-gas of the stack, and a carbon capture system (CCS) configured to capture carbon dioxide from off-gas of the burner heat-exchanged in at least one of the reformer and the first air heat exchanger.

The off-gas of the burner may be heat-exchanged in a steam generator of the reformer.

In another embodiment, the SOE-SOFC-CCS hybrid system may further include a first distributor (D1) configured to distribute at least some of cathode off-gas of the stack to the second air heat exchanger and to distribute the remainder of the cathode off-gas to the fuel heat exchanger.

In this case, the SOE-SOFC-CCS hybrid system may further include a temperature sensor (A) configured to measure the temperature of the outside air that has passed through the first air heat exchanger and a controller configured to transmit a control signal including a distribution ratio of the second air heat exchanger to the fuel heat exchanger determined based on a value measured by the temperature sensor (A) to the first distributor (D1).

In another embodiment, the SOE-SOFC-CCS hybrid system may further include a second distributor (D2) configured to distribute at least some of the off-gas of the burner that has passed through the first air heat exchanger to the burner and to distribute the remainder of the off-gas of the burner to the carbon capture system.

In this case, the SOE-SOFC-CCS hybrid system may further include a temperature sensor (B) configured to measure the temperature of the burner and a controller configured to transmit a control signal including a distribution ratio of the burner to the carbon capture system determined based on a value measured by the temperature sensor (B) to the second distributor (D2).

In another embodiment, the SOE-SOFC-CCS hybrid system may further include a third distributor (D3) configured to distribute at least some of the off-gas of the solid oxide electrolyzer cell so as to be merged with the outside air and to distribute the remainder of the off-gas of the solid oxide electrolyzer cell to the burner.

In a further embodiment, the SOE-SOFC-CCS hybrid system may further include a fourth distributor (D4) configured to distribute at least some of the off-gas of the burner to the solid oxide electrolyzer cell and to distribute the remainder of the off-gas of the burner to the reformer.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a view showing the detailed construction of a reformer in the first embodiment of the present disclosure;

FIG. 6 is a view showing the construction of an SOE-SOFC-CCS hybrid system according to a fifth embodiment of the present disclosure.

DETAILED DESCRIPTION OF THE INVENTION

Hereinafter, embodiments of the present disclosure will be described in detail with reference to the accompanying drawings. However, the present disclosure is not limited to a certain specific embodiment, and it should be understood that all transformations, equivalents, and substitutions including technical idea of the present disclosure are included in the scope of the present disclosure.

In this specification, a singular representation includes a plural representation unless it represents a definitely different meaning from the context.

When one element is referred to as "having", "comprising", or "including" another element in this specification, this means that other elements are not excluded but are further included, unless mentioned otherwise.

When one element is referred to as being "connected to" another element in this specification, this may mean that the two elements are directly connected to each other; however, the present disclosure is not limited thereto, the two elements may be connected to each other via one or more other elements disposed therebetween.

First Embodiment

Figure 1:
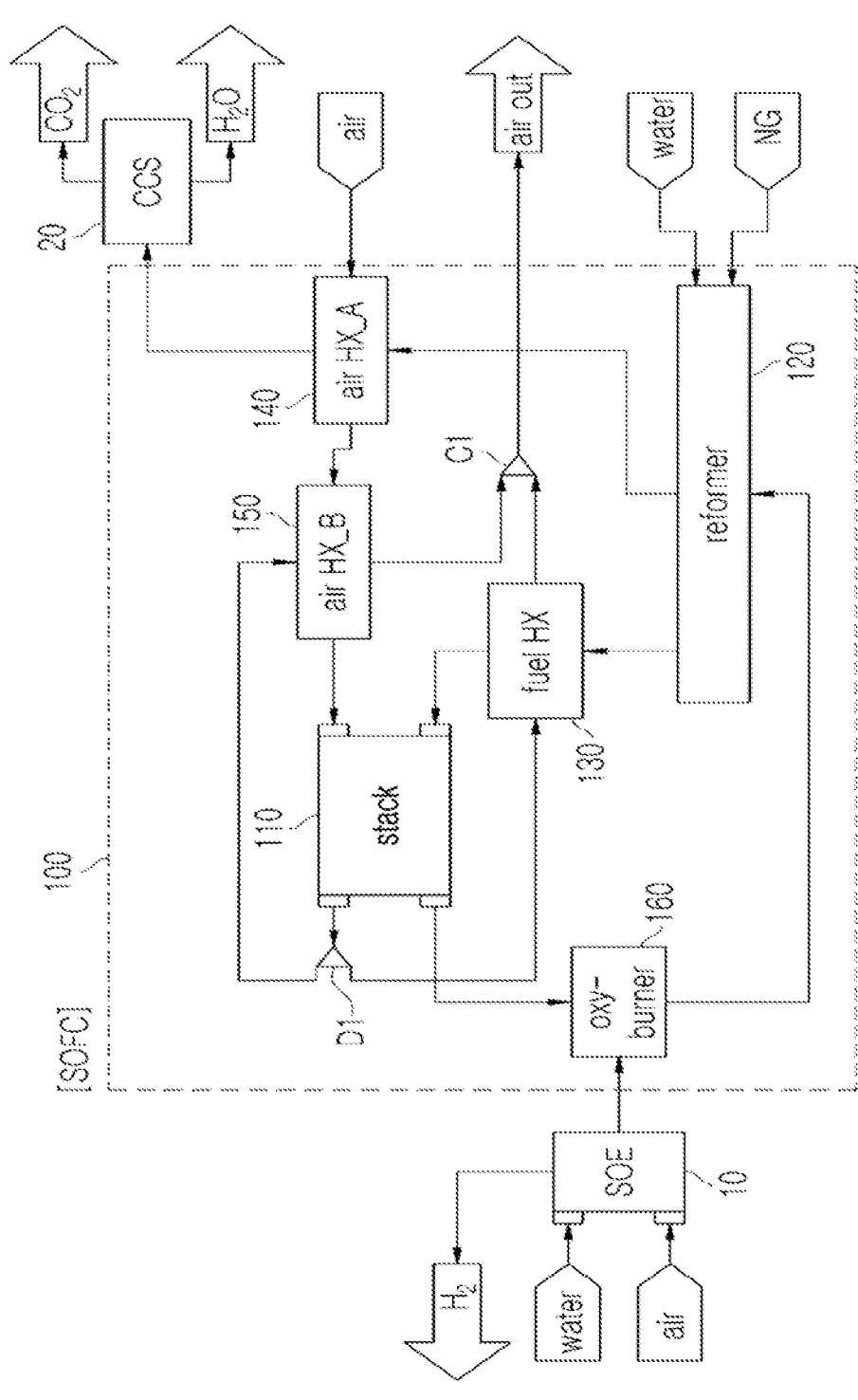
FIG. 1 is a view showing the construction of an SOE-SOFC-CCS hybrid system according to a first embodiment of the present disclosure.

FIG. 1 is a view showing the construction of an SOE-SOFC-CCS hybrid system according to a first embodiment of the present disclosure.

The hybrid system according to the first embodiment of the present disclosure includes a solid oxide electrolyzer cell (SOE) 10, a solid oxide fuel cell (SOFC) 100, and a carbon capture system (CCS) 20.

The solid oxide electrolyzer cell 10 electrolyzes pure water using electrical energy to produce hydrogen. The solid oxide electrolyzer cell 10 includes a total of three ceramic layers constituted by a porous anode, a porous cathode, and an impermeable electrolyte. When steam is introduced into the anode of the solid oxide electrolyzer cell 10 and voltage is applied to the cathode of the solid oxide electrolyzer cell 10, water molecules are divided into hydrogen and oxygen as the result of steam electrolysis.

The solid oxide electrolyzer cell 10 supplies oxygen obtained as the result of water electrolysis to a burner 160 of the solid oxide fuel cell (SOFC) 100 through a cathode output, and discharges hydrogen and other compositions through an anode output.

The solid oxide fuel cell (SOFC) 100 is a fuel cell using an ion-conductive ceramic as an electrolyte. The solid oxide fuel cell (SOFC) 100 includes a stack constituted by an oxygen ion-conductive electrolyte and a cathode (air electrode) and an anode (fuel electrode) located on opposite surfaces of the oxygen ion-conductive electrolyte.

When air and hydrogen are supplied respectively to the cathode and the anode, oxygen reduction reaction occurs at the cathode, whereby oxygen ions are generated. The oxygen ions move to the anode through the electrolyte. The oxygen ions react with the hydrogen supplied to the anode, whereby water is generated. At this time, electrons are generated at the anode, and the electrons are consumed at the cathode. Consequently, current flows between the two electrodes connected each to other, whereby electricity is produced.

The solid oxide fuel cell 100 may directly use pure hydrogen as a fuel, or may use hydrogen obtained as the result of reforming an outside fuel, such as liquefied petroleum gas (LPG), pipeline natural gas (PNG), compressed natural gas (CNG), or a hydrocarbon-based fuel (e.g. natural gas), as a fuel.

The solid oxide fuel cell 100 includes a stack 110, a reformer 120, a fuel heat exchanger 130, a first air heat exchanger 140, a second air heat exchanger 150, a burner 160, a first distributor D1, a first confluence device C1, and a controller (not shown).

The stack 110 receives outside air heated by the first air heat exchanger (air HX_A) 140 through a cathode, and receives hydrogen generated by the reformer 120 through an anode.

The reformer 120 reforms an outside fuel into hydrogen using any one of steam methane reforming, partial oxidation reaction, and auto-thermal reforming.

In steam methane reforming, steam is mixed with methane (or natural gas) at a temperature of 700 to 1,100° C., and reaction is performed in a catalyst reactor at a pressure of 3 to 25 bar to produce hydrogen. In partial oxidation reaction, a smaller amount of oxygen than the amount of oxygen necessary to decompose natural gas into water and carbon dioxide is supplied to produce hydrogen, carbon monoxide, and carbon dioxide. In auto-thermal reforming, heat necessary for steam reforming endothermic reaction is supplied during partial oxidation exothermic reaction in order to reform hydrogen.

The first embodiment and the following embodiments will be described on the assumption that the reformer 120 performs reforming using steam methane reforming; however, the present disclosure is not limited thereto.

Since steam methane reforming is generally an endothermic reaction, outside heat must be supplied, and a catalyst layer configured to promote conversion into hydrogen is provided at the rear end. In embodiments of the present disclosure, the reformer 120 may use a nickel (Ni)-based catalyst.

The reformer 120 cracks $C_2+$ hydrocarbon included in a reaction raw material (or fuel), i.e. ethane ($C_2H_6$) or propane ($C_3H_8$), into $CH_4$, CO, and $H_2$, and reforms some of methane ($CH_4$) into hydrogen. It is possible to inhibit coke generation (or carbon deposition) of the catalyst layer due to pyrolysis of high-grade hydrocarbons through the cracking process.

The fuel heat exchanger (fuel HX) 130 is disposed between the reformer 120 and an anode input of the stack 110. The fuel heat exchanger 130 preheats the production amount of hydrogen from the reformer 130 to a predetermined temperature, and supplies the preheated hydrogen to the anode input of the stack 110. The fuel heat exchanger 130 may preheat hydrogen produced by the reformer 130 using thermal energy obtained as the result of heat exchange with cathode off-gas of the stack 110. The off-gas heat-exchanged in the fuel heat exchanger 130 is discharged from the solid oxide fuel cell 100.

The first air heat exchanger 140 preheats outside air to a predetermined temperature. The preheated outside air is directly input to the cathode of the stack 110, or is second-arily preheated by the second air heat exchanger 150 and is then input to the cathode of the stack 110.

The first air heat exchanger 140 preheats outside air using thermal energy obtained as the result of heat exchange with high-temperature off-gas output from the burner 160.

The entirety of the high-temperature off-gas output from the burner 160 is primarily heat-exchanged in the reformer 120 and is secondarily heat-exchanged in the reformer 120. Alternatively, some of the high-temperature off-gas output from the burner 160 may flow to the reformer 120, and the remainder of the high-temperature off-gas output from the burner 160 may flow to the first air heat exchanger 140, through a distributor (not shown) disposed at an output end of the burner 160. In the first embodiment, the off-gas output from the burner 160 is heat-exchanged in at least one of the reformer 120 and the first air heat exchanger 140 and is then input to the carbon capture system 20.

The second air heat exchanger 150 is disposed between the first air heat exchanger 140 and a cathode input of the stack 110. The second air heat exchanger 150 secondarily heats the outside air primarily heated by the first air heat exchanger 140 using thermal energy obtained as the result of heat exchange with cathode off-gas of the stack 110. Since the off-gas output from the burner 160 is drained of a considerable amount of thermal energy as the result of being heat-exchanged in the reformer 120, the amount of heat of the off-gas to be heat-exchanged in the first air heat exchanger 140 may not be sufficient. If the temperature of the outside air that has flowed through the first air heat exchanger 140 does not reach a reference temperature necessary for smooth chemical reaction, it is possible to secure thermal energy through additional heat exchange in the second air heat exchanger 150.

The burner 160 burns anode off-gas received from the anode output of the stack 110 using oxygen included in off-gas received from the solid oxide electrolyzer cell. When the off-gas of the stack 110 is burned in the burner 160, most of the other compositions included in the off-gas excluding carbon dioxide and water are burned, whereby the concen-tration of carbon dioxide (about 30%) and the concentration of water (about 60%) are increased.

The high-temperature off-gas output from the burner 160 is heat-exchanged in at least one of the reformer 120 and the first air heat exchanger 140, and is then supplied to the carbon capture system 20. Since the off-gas output from the burner 160 is mainly composed of carbon dioxide and water, as described above, the off-gas is easily divided into carbon dioxide and water by the carbon capture system 20.

The solid oxide fuel cell 100 may further include a first distributor D1 and a first confluence device C1.

The first distributor D1 is disposed at the rear of the cathode output of the stack. The first distributor D1 distrib-utes some of the cathode off-gas of the stack 110 to the fuel heat exchanger 130 and distributes the remainder of the cathode off-gas of the stack 110 to the second air heat exchanger 150.

The first distributor D1 has one input end and two output ends. The first distributor D1 may be provided with a control valve (not shown) configured to automatically or manually adjust the flow direction and the flow rate of a fluid. In addition, a temperature sensor (not shown) configured to measure the temperature of the outside air heated as the result of heat exchange with the first air heat exchanger 140 may be further provided in the vicinity of the output end of the first air heat exchanger 140 or in the vicinity of the input end of the second air heat exchanger 150.

The controller (not shown) determines the amount of the cathode off-gas of the stack to be distributed to the second air heat exchanger 150 through the first distributor D1 based on the value measured by the temperature sensor, and transmits a control signal including the determined value to the first distributor D1.

The cathode off-gas distributed to the fuel heat exchanger 130 through the first distributor D1 and the cathode off-gas distributed to the second air heat exchanger 150 through the first distributor D1 are merged at the first confluence device C1 and then discharged to the outside.

The carbon capture system 20 captures carbon dioxide from the off-gas of the burner heat-exchanged in at least one of the reformer 120 and the first air heat exchanger 140.

The carbon capture system 20 may perform capture using any one of post-combustion capture, pre-combustion cap-ture, oxy-fuel combustion, and pressure swing adsorption.

Figure 2:
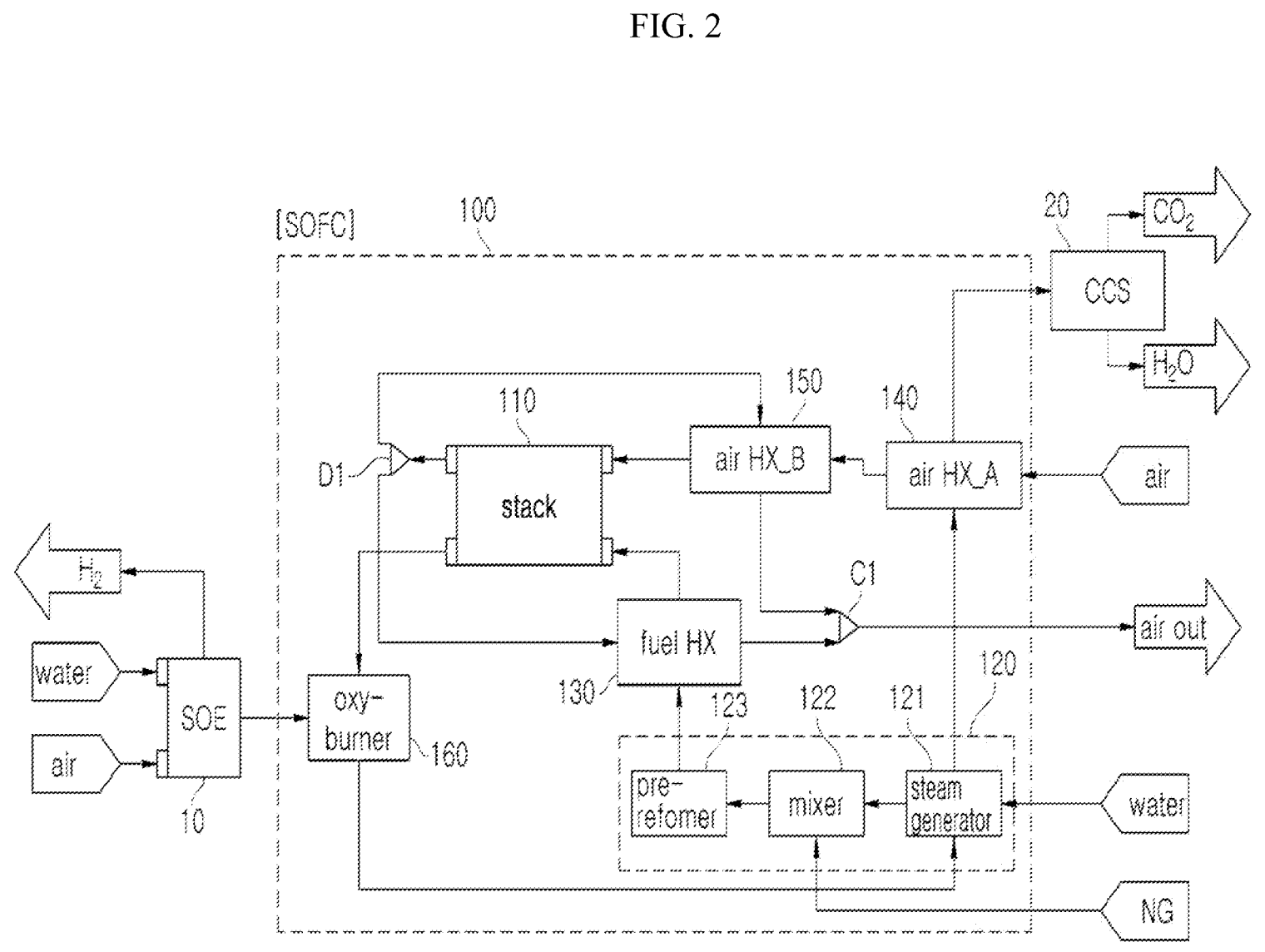

FIG. 2 is a view showing the detailed construction of the reformer in the first embodiment of the present disclosure.

FIG. 2 is identical to FIG. 1 except for the detailed construction of the reformer 120.

As can be seen from FIG. 2, a reformer 120 according to an embodiment includes a steam generator 121, a mixer 122, and a pre-reformer 123.

The steam generator 121 heats water supplied from the outside to generate steam. The steam generator 121 may heat water using thermal energy obtained as the result of heat exchange with the off-gas of the burner 160.

The high-temperature off-gas output from the burner 160 may be heat-exchanged in the steam generator 121, may move to the first air heat exchanger 140, and may be heat-exchanged again in the first air heat exchanger 140. The off-gas of the burner 160 heat-exchanged in the first air heat exchanger 140 is supplied to the carbon capture system 20, in which the off-gas is divided into carbon dioxide and water.

The mixer 122 mixes a natural fuel (e.g. natural gas) received from the outside with the steam generated by the steam generator 121.

The pre-reformer 123 produces hydrogen from a mixture of the steam and the natural gas. The hydrogen produced by the pre-reformer 123 is supplied to the fuel heat exchanger 130, in which the temperature of the hydrogen is increased, and the hydrogen is input to the anode of the stack 110.

Second Embodiment

A second embodiment relates to technology for recycling some of off-gas of a burner to the burner to improve purity of carbon dioxide, unlike the first embodiment configured such that the entirety of the off-gas of the burner is supplied to the carbon capture system, thereby improving carbon dioxide capture efficiency.

Figure 3:
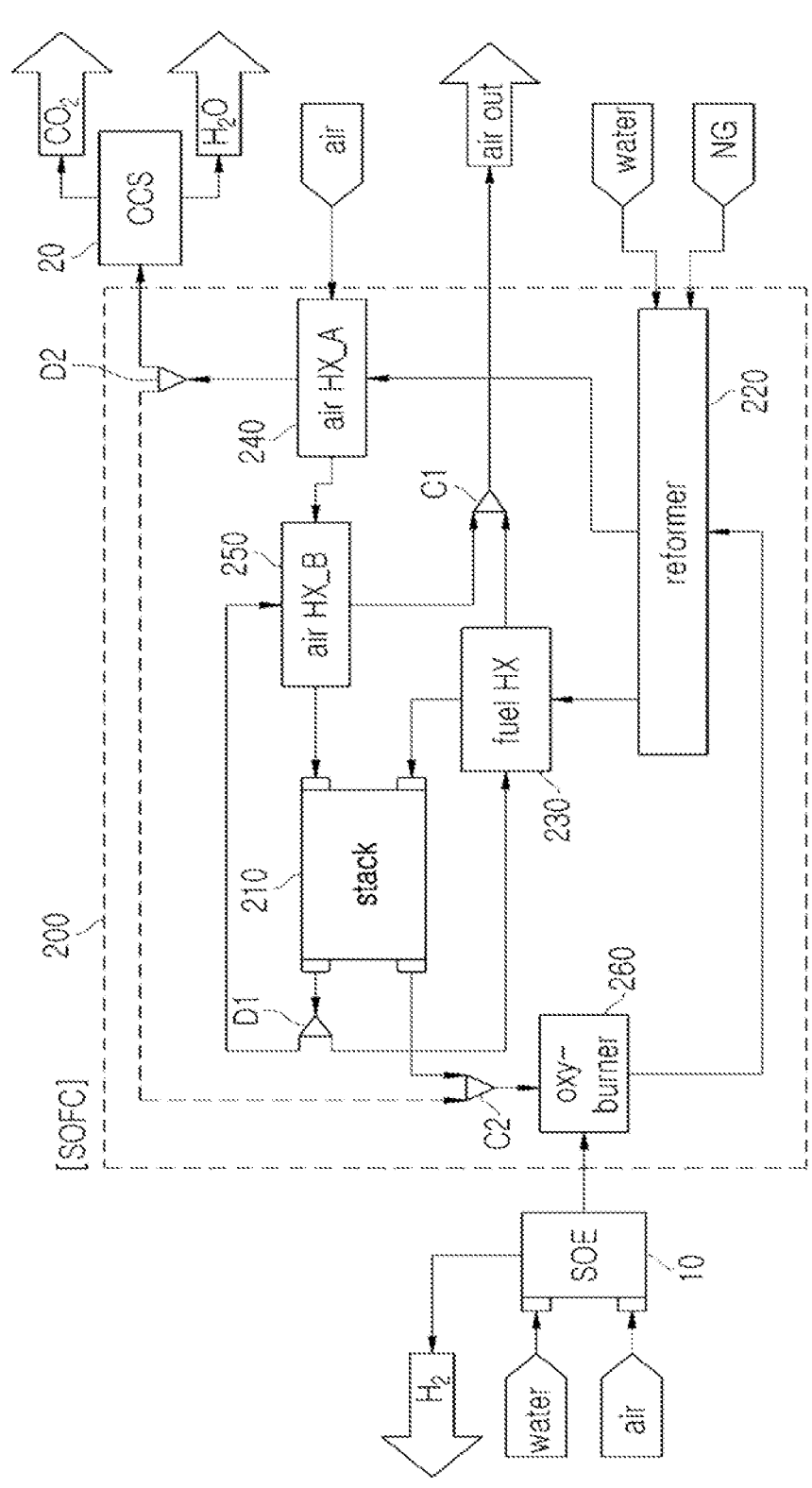
FIG. 3 is a view showing the construction of an SOE-SOFC-CCS hybrid system according to a second embodiment of the present disclosure.

FIG. 3 is a view showing the construction of an SOE-SOFC-CCS hybrid system according to a second embodi-ment of the present disclosure.

The hybrid system according to the second embodiment of the present disclosure includes a solid oxide electrolyzer cell 10, a solid oxide fuel cell 200, and a carbon capture system 20, wherein the solid oxide fuel cell 200 includes a stack 210, a reformer 220, a fuel heat exchanger 230, a first air heat exchanger 240, a second air heat exchanger 250, a burner 260, a first distributor D1, a second distributor D2, a first confluence device C1, a second confluence device C2, and a controller (not shown).

The solid oxide electrolyzer cell 10, the stack 210, the reformer 220, the fuel heat exchanger 230, the first air heat exchanger 240, the second air heat exchanger 250, the burner 260, the first distributor D1, the first confluence device C1, the controller (not shown), and the carbon capture system 20 of the second embodiment are basically identical in construction to the solid oxide electrolyzer cell 10, the stack 110, the reformer 120, the fuel heat exchanger 130, the first air heat exchanger 140, the second air heat exchanger 150, the burner 160, the first distributor D1, the first confluence device C1, the controller (not shown), and the carbon capture system 20 of the first embodiment, and therefore only the difference therebetween will hereinafter be described.

The second distributor D2 is disposed at the rear of the first air heat exchanger 240. The second distributor D2 distributes some of off-gas of the burner 260 heat-exchanged in the reformer 220 and the first air heat exchanger 240 to the carbon capture system 20, and distributes the remainder of the off-gas to the burner 260.

The second confluence device C2 merges the remainder of the burner off-gas distributed to the burner 260 with anode off-gas of the stack 210. The gas merged in the second confluence device C2 is input to the burner 260 again.

When some of the off-gas of the burner 260 is recycled to the burner 260 again, as described above, the following effects may be achieved.

First, the off-gas of the burner 260 is basically $CO_2$ rich gas having high concentration of carbon dioxide through combustion reaction; however, a small amount of non-reacted fuel (e.g. $H_2$ and CO) remains in the off-gas. Some of the burner off-gas that has passed through the reformer 220 and the first air heat exchanger 240 is supplied to the burner again so as to be burned, whereby the residual non-reacted fuel is further converted into carbon dioxide. That is, whenever the burner off-gas is recycled, the burner off-gas becomes $CO_2$ richer gas. The carbon capture system 20 may more easily capture carbon dioxide from the $CO_2$ richer gas.

Second, the off-gas of the burner 260 is cooled as the result of heat exchange while passing through the reformer 220 and the first air heat exchanger 240. When inert gas, such as carbon dioxide, included in the off-gas of the burner 260 is recycled to the burner 260, therefore, it is possible to adjust the temperature of the burner 260 or prevent over-heating of the burner 260.

Third, in the second embodiment, burner off-gas distributed through the second distributor D2 is further input to the burner 260 in addition to off-gas of the SOE and anode off-gas of the stack, compared to the first embodiment configured such that off-gas of the SOE and anode off-gas of the stack are input to the burner 160 as a fuel. As the burner off-gas is recycled, therefore, the flow rate (mass) from the burner 260 to the reformer 220 and the first air heat exchanger 240 is increased, whereby heat exchange efficiency is improved.

Third Embodiment

A third embodiment relates to technology for supplying some of off-gas (oxygen) of a solid oxide electrolyzer cell 10 to a burner 360 and merging the remainder of the off-gas with outside air introduced to a cathode of a stack, instead of supplying the entirety of the off-gas of the solid oxide electrolyzer cell 10 to the burner, unlike the first embodiment second embodiment. According to the third embodiment, the concentration of oxygen introduced into the cathode of the stack is increased, whereby it is possible to improve electricity production efficiency of a solid oxide fuel cell.

Figure 4:
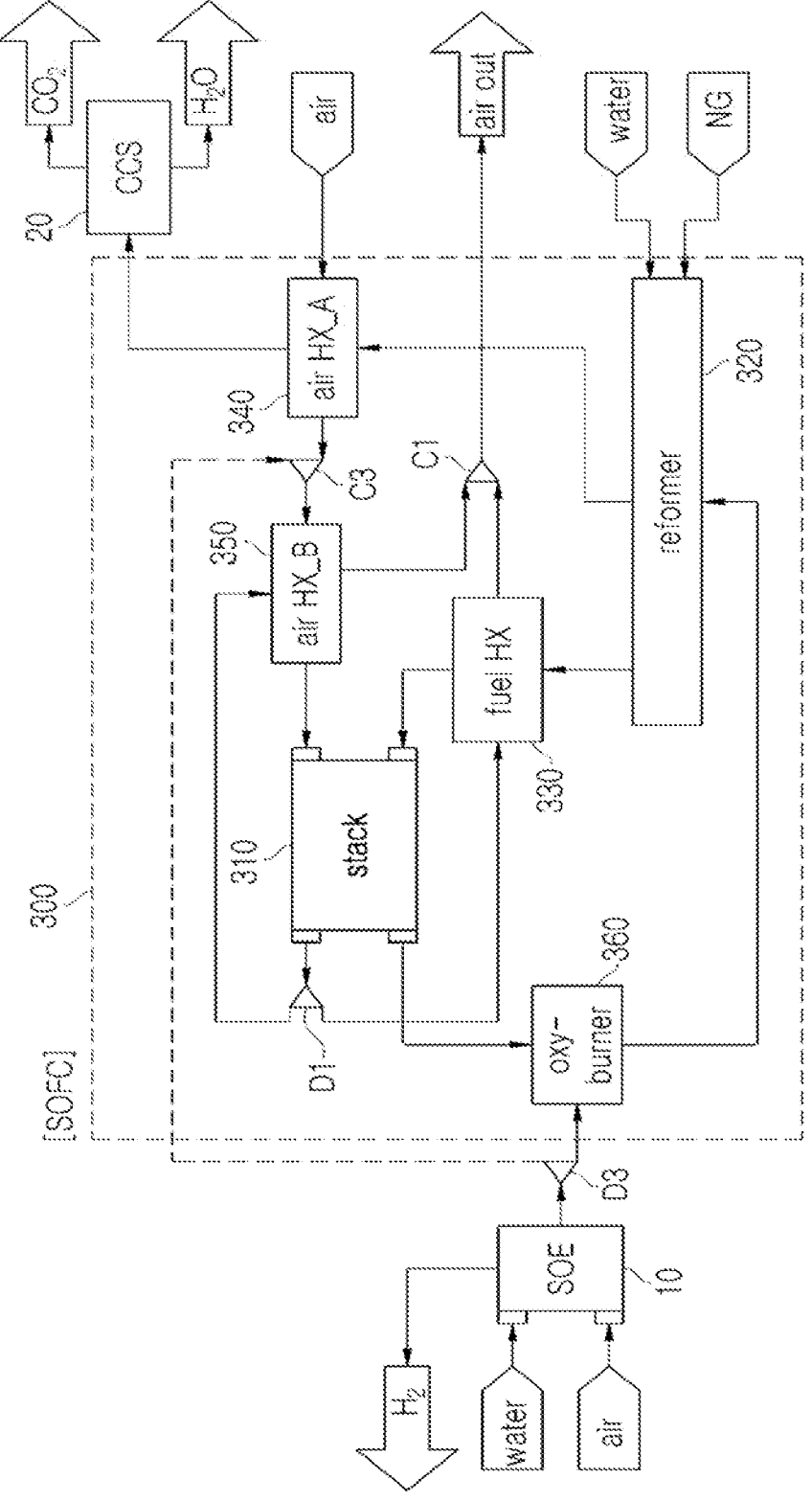
FIG. 4 is a view showing the construction of an SOE-SOFC-CCS hybrid system according to a third embodiment of the present disclosure.

The third embodiment may be a modification in which a third distributor D3 and a third confluence device C3 are further included in the first embodiment or a modification in which a third distributor D3 and a third confluence device C3 are further included in the second embodiment. FIG. 4 shows a modification in which a third distributor D3 and a third confluence device C3 are further included in the first embodiment.

As shown in FIG. 4, the hybrid system according to the third embodiment of the present disclosure includes a solid oxide electrolyzer cell 10, a solid oxide fuel cell 300, and a carbon capture system 20, wherein the solid oxide fuel cell 300 includes a stack 310, a reformer 320, a fuel heat exchanger 330, a first air heat exchanger 340, a second air heat exchanger 350, a burner 360, a first distributor D1, a third distributor D3, a first confluence device C1, a third confluence device C3, and a controller (not shown).

The solid oxide electrolyzer cell 10, the stack 310, the reformer 320, the fuel heat exchanger 330, the first air heat exchanger 340, the second air heat exchanger 350, the burner 360, the first distributor r D1, the first confluence device C1, the controller (not shown), and the carbon capture system 20 of the third embodiment are basically identical in construction to the solid oxide electrolyzer cell 10, the stack 110, the reformer 120, the fuel heat exchanger 130, the first air heat exchanger 140, the second air heat exchanger 150, the burner 160, the first distributor D1, the first confluence device C1, the controller (not shown), and the carbon capture system 20 of the first embodiment, and therefore only the difference therebetween will hereinafter be described.

The third distributor D3 is disposed at an output end of the solid oxide electrolyzer cell 10. The third distributor D3 distributes some of SOE off-gas of the solid oxide electrolyzer cell 10 to the burner 360, and merges the remainder of the off-gas with outside air introduced into the cathode of the stack.

The third confluence device C3 is disposed between the first air heat exchanger 340 and the second air heat exchanger 350. The third confluence device C3 merges the outside air that has passed through the first air heat exchanger 340 with the SOE off-gas of the solid oxide electrolyzer cell 10 distributed through the third distributor D3. The merged gas mixture is input to the cathode of the stack 310 via the second air heat exchanger 350.

In a modification, the third confluence device C3 may be disposed between the second air heat exchanger 350 and the cathode of the stack 310. In this case, the outside air heated by the second air heat exchanger 350 and the off-gas of the solid oxide electrolyzer cell 10 distributed through the second distributor D2 are merged in the third confluence device C3, and are input to the cathode of the stack 310.

The off-gas of the solid oxide electrolyzer cell 10 includes oxygen. When a larger amount of off-gas of the solid oxide electrolyzer cell is distributed to the burner 360 through the third distributor D3, therefore, combustion in the burner is further accelerated, whereby purity of carbon dioxide included in the burner off-gas is improved, and therefore the carbon dioxide capture rate of the carbon capture system 20 is increased. In addition, when a larger amount of off-gas of the solid oxide electrolyzer cell is distributed to the air heat exchanger 340 or 350 through the third distributor D3, a larger amount of oxygen is input to the cathode of the stack, whereby electricity output of the stack is increased.

The controller (not shown) determines the distribution ratio of the burner 360 to the air heat exchanger 340 or 350 based on carbon dioxide capture amount set in the hybrid system or electricity output, and transmits a control signal including the determined distribution ratio to the third distributor D3.

Fourth Embodiment

A fourth embodiment relates to technology for recycling some of off-gas of a burner to a solid oxide electrolyzer cell and supplying the remainder of the off-gas to a reformer, instead of supplying the entirety of the off-gas of the burner to the reformer, unlike the first embodiment to the third embodiment.

Figure 5:
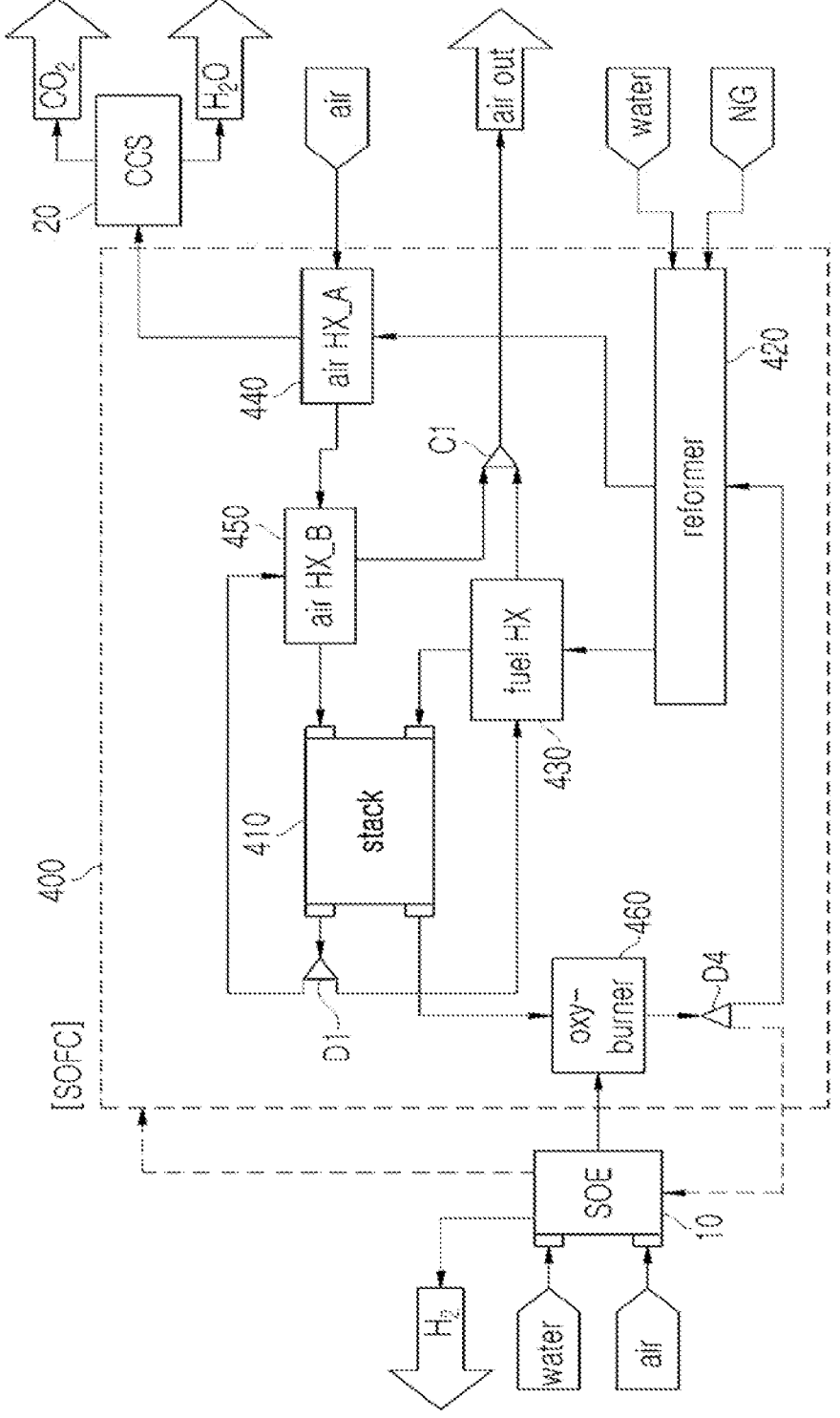
FIG. 5 is a view showing the construction of an SOE-SOFC-CCS hybrid system according to a fourth embodiment of the present disclosure.

The fourth embodiment may be a modification in which a fourth distributor D4 is further included in the first embodiment or a modification in which a fourth distributor D4 is further included in the second embodiment. FIG. 5 shows a modification in which a fourth distributor D4 is further included in the first embodiment.

As shown in FIG. 5, the hybrid system according to the fourth embodiment of the present disclosure includes a solid oxide electrolyzer cell 10, a solid oxide fuel cell 400, and a carbon capture system 20, wherein the solid oxide fuel cell 400 includes a stack 410, a reformer 420, a fuel heat exchanger 430, a first air heat exchanger 440, a second air heat exchanger 450, a burner 460, a first distributor D1, a fourth distributor D4, a first confluence device C1, and a controller (not shown).

The solid oxide electrolyzer cell 10, the stack 410, the reformer 420, the fuel heat exchanger 430, the first air heat exchanger 440, the second air heat exchanger 450, the burner 460, the first distributor D1, the first confluence device C1, the controller (not shown), and the carbon capture system 20 of the fourth embodiment are basically identical in construction to the solid oxide electrolyzer cell 10, the stack 110, the reformer 120, the fuel heat exchanger 130, the first air heat exchanger 140, the second air heat exchanger 150, the burner 160, the first distributor D1, the first confluence device C1, the controller (not shown), and the carbon capture system 20 of the first embodiment, and therefore only the difference therebetween will be hereinafter described.

The fourth distributor D4 is disposed at the rear of the burner 460.

The fourth distributor D4 recycles some of off-gas of the burner 460 to the solid oxide electrolyzer cell 10, and distributes the remainder of the off-gas to the reformer 420.

The solid oxide electrolyzer cell 10 supplies high-temperature burner off-gas distributed through the fourth distributor D4 to at least one heat exchanger included in the solid oxide electrolyzer cell in order to receive thermal energy.

When a larger amount of burner off-gas is distributed to the solid oxide electrolyzer cell 10 through the fourth distributor D4, the solid oxide electrolyzer cell is further activated, whereby the production amount of hydrogen is increased. When a larger amount of burner off-gas is distributed to the reformer 420 through the fourth distributor D4, the efficiency of the fuel cell 400 is improved, whereby electricity output is increased.

The controller (not shown) determines the distribution ratio of the solid oxide electrolyzer cell 10 to the reformer

420 based on the production amount of hydrogen set in the hybrid system or electricity output, and transmits a control signal including the determined distribution ratio to the fourth distributor D4.

Fifth Embodiment

A fifth embodiment relates to technology for merging the first to fourth embodiments.

Figure 6:
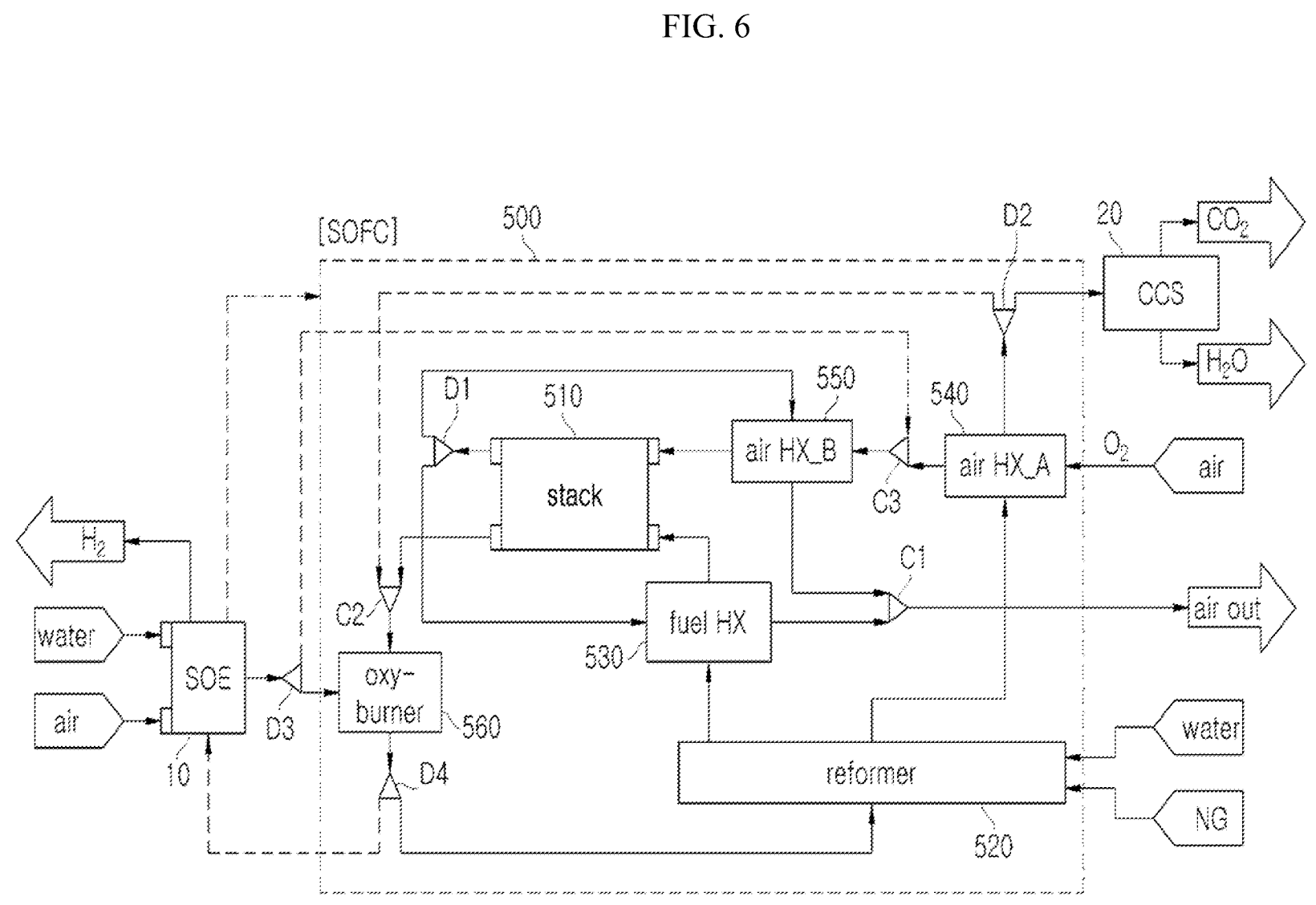

As shown in FIG. 6, the hybrid system according to the fifth embodiment of the present disclosure includes a solid oxide electrolyzer cell 10, a solid oxide fuel cell 500, and a carbon capture system 20, wherein the solid oxide fuel cell 500 includes a stack 510, a reformer 520, a fuel heat exchanger 530, a first air heat exchanger 540, a second air heat exchanger 550, a burner 560, a first distributor D1, a second distributor D2, a third distributor D3, a fourth distributor D4, a first confluence device C1, a second confluence device C2, a third confluence device C3, and a controller (not shown).

The solid oxide electrolyzer cell 10, the stack 510, the reformer 520, the fuel heat exchanger 530, the first air heat exchanger 540, the second air heat exchanger 550, the burner 560, the first distributor D1, the first confluence device C1, the controller (not shown), and the carbon capture system 20 of the fifth embodiment are identical in construction to the solid oxide electrolyzer cell 10, the stack 110, the reformer 120, the fuel heat exchanger 130, the first air heat exchanger 140, the second air heat exchanger 150, the burner 160, the first distributor D1, the first confluence device C1, the controller (not shown), and the carbon capture system 20 of the first embodiment.

In addition, the second distributor D2, the second confluence device C2, and the controller (not shown) of the fifth embodiment are identical in construction to the second distributor D2, the second confluence device C2, and the controller (not shown) of the second embodiment, the third distributor D3, the third confluence device C3, and the controller (not shown) of the fifth embodiment are identical in construction to the third distributor D3, the third confluence device C3, and the controller (not shown) of the third embodiment, and the fourth distributor D4 and the controller (not shown) of the fifth embodiment are identical in construction to the fourth distributor D4 and the controller (not shown) of the fourth embodiment.

As is apparent from the above description, an embodiment of the present disclosure has an effect in that, in a hybrid system including a solid oxide electrolyzer cell and a solid oxide fuel cell, off-gas of the solid oxide electrolyzer cell is not directly discharged but is used for combustion in a burner, whereby it is possible to improve operation efficiency.

In addition, an embodiment of the present disclosure has an effect in that, in a hybrid system including a solid oxide electrolyzer cell, a solid oxide fuel cell, and a carbon capture system, impurities are removed from a non-reacted fuel included in anode off-gas of a stack or off-gas of the solid oxide electrolyzer cell in advance, whereby it is possible to maximize carbon dioxide capture efficiency.

In addition, an embodiment of the present disclosure has an effect in that by-products and waste heat generated during systematic operation of the solid oxide fuel cell and the carbon capture system are recycled, whereby it is possible to minimize fuel consumption.

Although the present disclosure has been described with reference to the embodiments, it will be apparent to those skilled in the art that various modifications and variations can be made in the present disclosure without departing from the idea and category of the present disclosure defined by the appended claims.

What is claimed is:

1. An SOE-SOFC-CCS hybrid system comprising:
a solid oxide electrolyzer cell (SOE);
a solid oxide fuel cell (SOFC) comprising a reformer, a fuel heat exchanger (fuel HX) configured to heat a fuel produced by the reformer, a first air heat exchanger (air HX_A) configured to primarily heat outside air, a second air heat exchanger (air HX_B) configured to secondarily heat the primarily heated outside air, a stack comprising an anode configured to receive the fuel heated by the fuel heat exchanger and a cathode configured to receive the outside air heated by the first air heat exchanger and the second air heat exchanger, and a burner configured to burn off-gas of the solid oxide electrolyzer cell and anode off-gas of the stack; and
a carbon capture system (CCS) configured to capture carbon dioxide from off-gas of the burner heat-exchanged in at least one of the reformer and the first air heat exchanger.

2. The SOE-SOFC-CCS hybrid system according to claim 1, wherein the off-gas of the burner is heat-exchanged in a steam generator of the reformer.

3. The SOE-SOFC-CCS hybrid system according to claim 1, further comprising a first distributor (D1) configured to distribute at least some of cathode off-gas of the stack to the second air heat exchanger and to distribute a remainder of the cathode off-gas s to the fuel heat exchanger.

4. The SOE-SOFC-CCS hybrid system according to claim 3, further comprising:

a temperature sensor (A) configured to measure temperature of the outside air that has passed through the first air heat exchanger; and
a controller configured to transmit a control signal comprising a distribution ratio of the second air heat exchanger to the fuel heat exchanger determined based on a value measured by the temperature sensor (A) to the first distributor (D1).

5. The SOE-SOFC-CCS hybrid system according to claim 1, further comprising a second distributor (D2) configured to distribute at least some of the off-gas of the burner that has passed through the first air heat exchanger to the burner and to distribute a remainder of the off-gas of the burner to the carbon capture system.

6. The SOE-SOFC-CCS hybrid system according to claim 5, further comprising:
a temperature sensor (B) configured to measure temperature of the burner; and
a controller configured to transmit a control signal comprising a distribution ratio of the burner to the carbon capture system determined based on a value measured by the temperature sensor (B) to the second distributor (D2).

7. The SOE-SOFC-CCS hybrid system according to claim 1, further comprising a third distributor (D3) configured to distribute at least some of the off-gas of the solid oxide electrolyzer cell so as to be merged with the outside air and to distribute a remainder of the off-gas of the solid oxide electrolyzer cell to the burner.

8. The SOE-SOFC-CCS hybrid system according to claim 1, further comprising a fourth distributor (D4) configured to distribute at least some of the off-gas of the burner to the solid oxide electrolyzer cell and to distribute a remainder of the off-gas of the burner to the reformer.

* * * * *